US012134273B2

(12) United States Patent
Toda et al.

(10) Patent No.: US 12,134,273 B2
(45) Date of Patent: Nov. 5, 2024

(54) LIQUID DISCHARGE HEAD

(71) Applicant: CANON KABUSHIKI KAISHA, Tokyo (JP)

(72) Inventors: Kyosuke Toda, Kanagawa (JP); Takeho Miyashita, Kanagawa (JP); Chiaki Muraoka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 17/847,047

(22) Filed: Jun. 22, 2022

(65) Prior Publication Data

US 2022/0410570 A1 Dec. 29, 2022

(30) Foreign Application Priority Data

Jun. 25, 2021 (JP) ................................ 2021-105640

(51) Int. Cl.
*B41J 2/14* (2006.01)
*B41J 2/145* (2006.01)

(52) U.S. Cl.
CPC ...... *B41J 2/145* (2013.01); *B41J 2002/14491* (2013.01)

(58) Field of Classification Search
CPC .................... B41J 2/14072; B41J 2002/14491
See application file for complete search history.

(56) References Cited

U.S. PATENT DOCUMENTS 6,241,340 B1 * 6/2001 Watanabe ............ B41J 2/14024 347/50
6,244,696 B1 * 6/2001 Tran ..................... B41J 2/17513 347/87
2006/0061623 A1 * 3/2006 Ohashi ................. B41J 2/17526 347/50
2006/0139410 A1 * 6/2006 Kawamura .......... B41J 2/14072 347/58
2007/0093001 A1 * 4/2007 Garcia ................. B41J 2/14072 438/126
2007/0229606 A1 * 10/2007 Taira .................... B41J 2/14209 347/71
2007/0242101 A1 * 10/2007 Hirosawa ............... B41J 2/1623 347/50
2008/0174636 A1 * 7/2008 Kim ..................... B41J 2/14072 347/47
2009/0040278 A1 * 2/2009 Silverbrook ........... B41J 2/1639 347/61
2009/0309915 A1 * 12/2009 Noguchi ................ B41J 2/1607 29/890.1
2010/0302316 A1 * 12/2010 Tsukamoto ................ B41J 2/14 347/50
2011/0181665 A1 * 7/2011 Takaoka ..................... B41J 2/14 347/50

FOREIGN PATENT DOCUMENTS

CN 101607478 A * 12/2009 .......... B41J 2/14072
CN 112352123 A * 2/2021 .......... B41J 2/14201
JP 2007-313831 A 12/2007

* cited by examiner

*Primary Examiner* — Julian D Huffman
(74) *Attorney, Agent, or Firm* — Canon U.S.A., Inc. IP Division

(57) ABSTRACT

A liquid discharge head includes an electric connecting portion between a flexible wiring substrate and a contact wiring substrate. The contact wiring substrate has a first surface on which a contact pad is provided and a second surface opposite the first surface. The electric connecting portion is disposed on the second surface side of the contact wiring substrate.

13 Claims, 9 Drawing Sheets

LIQUID DISCHARGE HEAD

BACKGROUND

Field of the Disclosure

The present disclosure relates to a liquid discharge head.

Description of the Related Art

In the inkjet field where liquid, such as ink, is discharged for recording, the recording applications have been diversified in recent years, and a head capable of discharging various types of ink is required. In general, it is often the case that water-based pigment color ink is alkaline. However, if ink compositions, such as neutral/acidic ink and ink with a high solvent ratio, can be freely selected, inkjet technology can be applied to special media and special applications and, in addition, the print quality can be improved.

Some liquid discharge heads have a configuration in which a liquid discharge element substrate that discharges liquid is electrically connected to a liquid discharge apparatus main body via a flexible wiring substrate and a contact wiring substrate. Furthermore, Japanese Patent Laid-Open No. 2007-313831 describes a configuration in which an electric connecting portion between a flexible wiring substrate and a contact wiring substrate is protected by a sealing material.

However, in the liquid discharge head described in Japanese Patent Laid-Open No. 2007-313831, the sealing material covering the electric connecting portion is exposed to the outside, so that the corrosion resistance to the liquid used depends on the performance and the amount of coating of the sealing material of the electric connecting portion. Therefore, when, for example, an acidic liquid that easily corrodes the electric connecting portion or a liquid that uses a solvent having high permeability or high solubility for the sealing material is used, the reliability of the electric connecting portion may be decreased due to deposition of mist or liquid on the electric connecting portion during the liquid discharge.

SUMMARY

Aspects of the present disclosure provide a liquid discharge head having improved liquid resistance properties of the electric connecting portion between the flexible wiring substrate and the contact wiring substrate.

According to an aspect of the present disclosure, a liquid discharge head includes a liquid discharge element substrate including a discharge element configured to discharge liquid, a flexible wiring substrate configured to be electrically connected to the liquid discharge element substrate, a contact wiring substrate including a first surface having a contact pad provided for external electrical connection, where the contact wiring substrate is electrically connected to the flexible wiring substrate, and a support member including a support surface configured to support a second surface opposite the first surface of the contact wiring substrate. An electric connecting portion between the flexible wiring substrate and the contact wiring substrate is provided on a second surface side of the contact wiring substrate.

Further features of the present disclosure will become apparent from the following description of exemplary embodiments with reference to the attached drawings.

DESCRIPTION OF THE EMBODIMENTS

Embodiments of the present disclosure are described below.

Note that a liquid discharge head and a liquid discharge apparatus according to the present disclosure can be used in printers, copying machines, facsimiles having a communication system, apparatuses including a printing unit (e.g., word processors), and industrial recording apparatuses combined with multiple processing units. The liquid discharge head and the liquid discharge apparatus according to the present disclosure can also be used for applications, such as biochip fabrication, electronic circuit printing, and printing on non-absorbent media.

In addition, since each of the embodiments described below is an appropriate particular example of the present disclosure, various technically desirable limitations are imposed to the embodiment. However, the present embodiment is not limited to the embodiment described herein and other particular methods as long as the present embodiment follows the spirit of the present disclosure. Furthermore, the configurations of the embodiments can be combined in any way as needed.

First Embodiment

Figure 1:
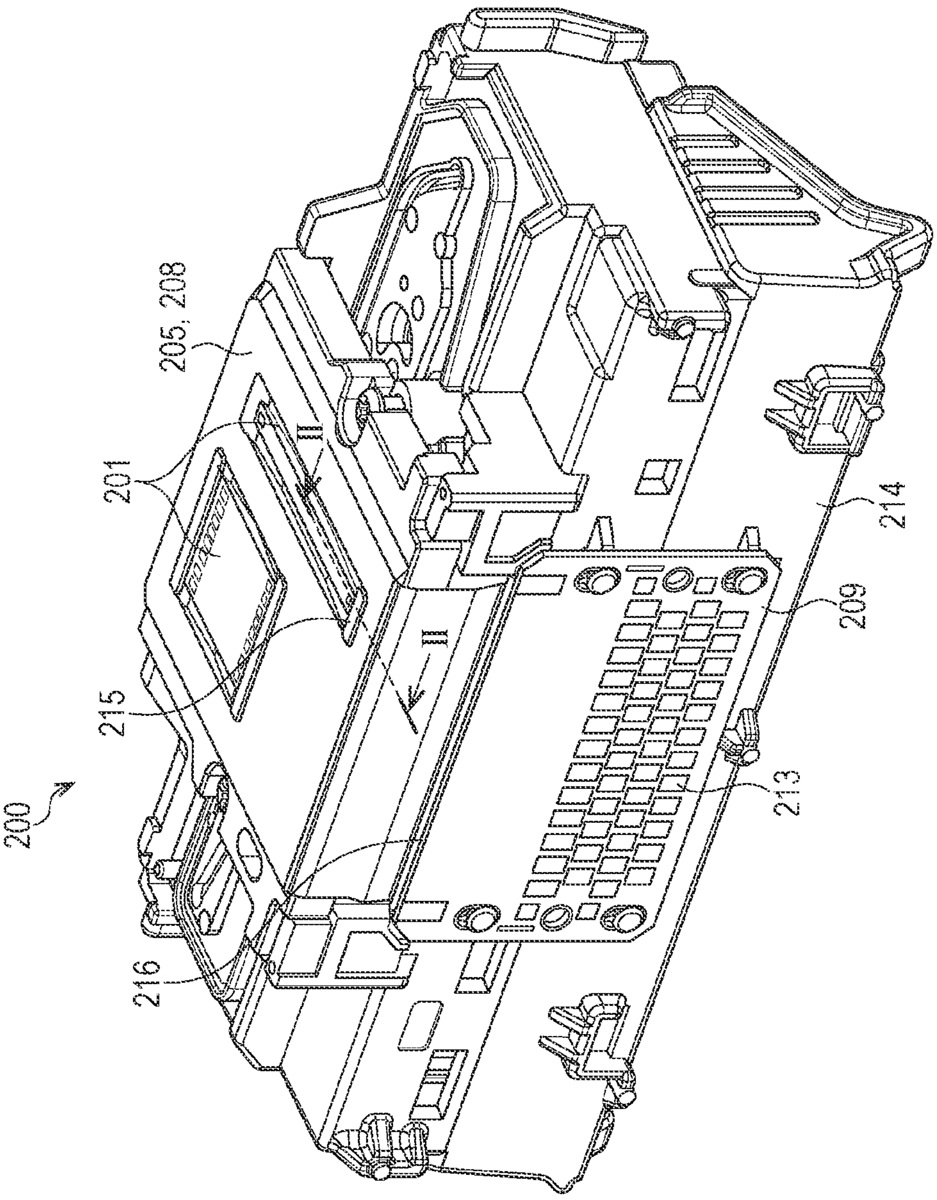
FIG. 1 is a perspective view of a liquid discharge head according to a first embodiment.
Figure 2:
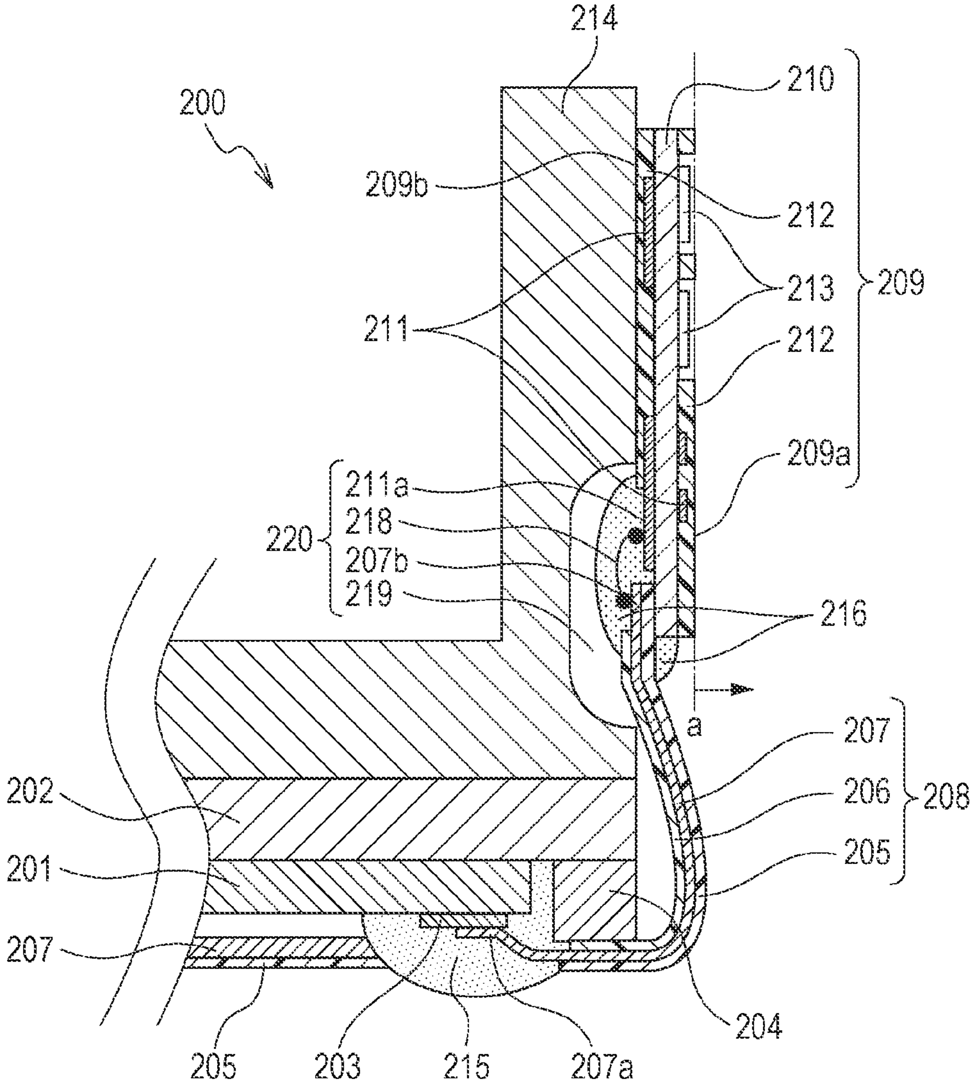
FIG. 2 is a cross-sectional view of the liquid discharge head according to the first embodiment.

FIG. 1 is a perspective view of a liquid discharge head 200 according to the first embodiment of the present disclosure. In FIG. 1, a print element substrate 201 (a liquid discharge element substrate) of the liquid discharge head 200 is disposed on the upper surface. The print element substrate 201 includes, on a surface thereof, a discharge port for discharging ink as a liquid. The ink is discharged in a direction substantially orthogonal to a surface of the print element substrate 201 by using a print element (a liquid discharge element) provided in the print element substrate 201. FIG. 2 is a cross-sectional view taken along the line II-II of FIG. 1. FIG. 2 is obtained by rotating FIG. 1 180 degrees. In FIG. 2, a surface of the print element substrate 201 faces downward, and the liquid discharge head 200 has a posture the same as when the liquid discharge head 200 performs a printing operation in the liquid discharge apparatus main body.

The electric power required for discharging ink is supplied to the print element substrate 201 from a contact wiring substrate 209 via a flexible wiring substrate 208. The contact wiring substrate 209 is disposed on a side surface of a head casing 214 and is in electrical contact with the liquid discharge apparatus main body. To produce the flexible wiring substrate 208, a wiring layer 207 is formed by etching a copper foil bonded to the upper side of a base film 205, and the wiring layer 207 is covered with a cover film 206. Note that the head casing 214 is also referred to as a "support member" that supports the contact wiring substrate 209.

By fixing the liquid discharge head 200 into the apparatus main body at a predetermined position, electrical connection with the apparatus main body is achieved. More specifically, the liquid discharge head 200 is brought into electrical contact with the apparatus main body by causing a contact pin 217 (FIGS. 4A and 4B) provided on the apparatus main body to contact with a contact pad 213 disposed on the contact wiring substrate 209.

The flexible wiring substrate 208 forms a flat shape on the surface side of the print element substrate 201 and, thus, the flexible wiring substrate 208 functions as a cap surface in contact with a main body cap (not illustrated). The main body cap is brought into contact with the cap surface, and decompression suction, for example, is performed to remove thickened ink around the discharge port. In addition, evaporation of the liquid from the discharge port can be prevented when not in use. The cap surface is at a height substantially the same as or greater than the discharge port surface having the discharge port of the print element substrate 201 formed therein. Thus, the cap surface has a function of reducing the chance of stress applied to the discharge port surface and the print element substrate 201 due to, for example, paper jamming during printing. According to the present embodiment, an adjustment plate 204 is disposed between a support member 202 that supports the print element substrate 201 and the flexible wiring substrate 208 to adjust the height of the cap surface with respect to the support member 202.

For this reason, the cap surface of the flexible wiring substrate 208, that is, the surface of the flexible wiring substrate 208 located adjacent to the surface of the print element substrate 201 is required to have material strength and excellent ink resistance properties. In general, in the flexible wiring substrate 208, the base film 205 is thicker and stronger than the cover film 206 for manufacturing reasons. Therefore, it is desirable that the base film 205 be positioned on the outer side of the liquid discharge head 200 so that the cap surface is formed by the base film 205 of the flexible wiring substrate 208, since the base film 205 uses the polyimide film having high strength and excellent ink resistance properties. For example, according to the present embodiment, the thickness of the base film 205 is 50 μm, and the thickness of the cover film 206 is 4.4 μm.

Since an electrode pad 203 of the print element substrate 201 is disposed on the same side as the discharge port surface having a discharge port for discharging liquid formed therein, electrical connection can be facilitated with the flexible wiring substrate 208 that constitutes the cap surface disposed on the same side. In addition, sealing protection can be facilitated. More specifically, electrical connection between the print element substrate 201 and the flexible wiring substrate 208 is made by connecting a flying lead 207*a* of the flexible wiring substrate 208 to the electrode pad 203 using a bonder. The electric connecting portion is coated and protected by a sealing material 215 having high ink resistance properties.

According to the present embodiment, a thermosetting epoxy-based sealing material is used as the sealing material 215. In a sealing material thermosetting step, also heated are the print element substrate 201, the support member 202 supporting the print element substrate 201, the flexible wiring substrate 208, and the adjustment plate 204 supporting the flexible wiring substrate 208. For this reason, if a thermosetting step of the sealing material 215 is performed, an engineering resin having heat resistance (for example, 150° C. or higher), an alumina material, or the like is selected for the support member 202 and the adjustment plate 204.

The configurations of the flexible wiring substrate 208 and the contact wiring substrate 209 and the electrical connection of both substrates are described below with reference to FIG. 2.

The contact wiring substrate 209 is a two-layer substrate. The contact wiring substrate 209 includes a glass epoxy substrate 210 and a wiring layer 211 on both surfaces of the glass epoxy substrate 210. Part of the wiring layer 211 is exposed on a surface opposite the surface of the glass epoxy substrate 210 facing the head casing 214 (that is, the outer side surface of the liquid discharge head 200), thus forming the contact pad 213. An electrode pad 211*a* to be connected to the flexible wiring substrate 208 is disposed on a surface 209*b* (a second surface) opposite a surface 209*a* (a first surface) of the contact wiring substrate 209 having the contact pad 213 provided thereon. A portion of the contact wiring substrate 209 other than the contact pad 213 and the electrode pad 211*a* is protected from ink mist and the like by using a resist material 212.

In the flexible wiring substrate 208, the wiring layer 207 is etched on the base film 205 and is covered with the cover film 206. To connect the flexible wiring substrate 208 to the contact wiring substrate 209, the wiring layer 207 is exposed at an end portion of the base film 205, thus forming an electrode pad 207*b*.

An end portion of the surface 209*b* of the contact wiring substrate 209 and an end portion of the base film 205 of the flexible wiring substrate 208 are bonded. The electrode pad 207*b* of the flexible wiring substrate 208 and the electrode pad 211*a* of the contact wiring substrate 209 are disposed on the same surface side, that is, on the side adjacent to the surface 209*b* opposite the surface 209*a* of the contact wiring substrate 209 having the contact pad 213 formed thereon. The electrode pad 207*b* and the electrode pad 211*a* are wire-bonded using a conductive wire 218 (a gold wire) to provide electrical connection. The contact wiring substrate 209 and an electric connecting portion 220 of the flexible wiring substrate 208 are covered and protected by a sealing material 216.

As described above, according to the present embodiment, the electric connecting portion 220 between the flexible wiring substrate 208 and the contact wiring substrate 209 is disposed on the side with the surface 209*b* of the contact wiring substrate 209 opposite the side with the contact pad 213. In this manner, since the electric connecting portion 220 between the contact wiring substrate 209 and the flexible wiring substrate 208 is not exposed to the outside of the liquid discharge head 200, a more reliable configuration against ink mist or the like can be provided. Furthermore, since the electrode pad 211*a* of the contact wiring substrate 209 and the electrode pad 207*b* of the flexible wiring substrate 208 face the head casing 214 of the liquid discharge head 200, higher reliability can be ensured against an external impact or the like.

Furthermore, the amount of protrusion of the sealing material 216 covering the electric connecting portion 220 toward the contact pad 213 can be reduced. The end portion adjacent to the contact wiring substrate 209 and its vicinity of the outer surface of the flexible wiring substrate 208 (a surface opposite the surface facing the head casing 214) may be protected by the sealing material 216. Even in this case, the possibility that the sealing material 216 rides on the surface of the contact pad 213 can be eliminated. More specifically, as illustrated in FIG. 2, it is desirable that the sealing material 216 have a shape so as not to protrude in the direction of the arrow beyond an imaginary line "a" representing the outermost surface of the contact pad 213. Even if the sealing material 216 has a shape protruding in the direction of the arrow beyond the imaginary line "a" due to the dispensing path, the amount of protrusion is reduced by the thickness of the flexible wiring substrate 208, so that the amount of protrusion can be reduced.

Figure 3:
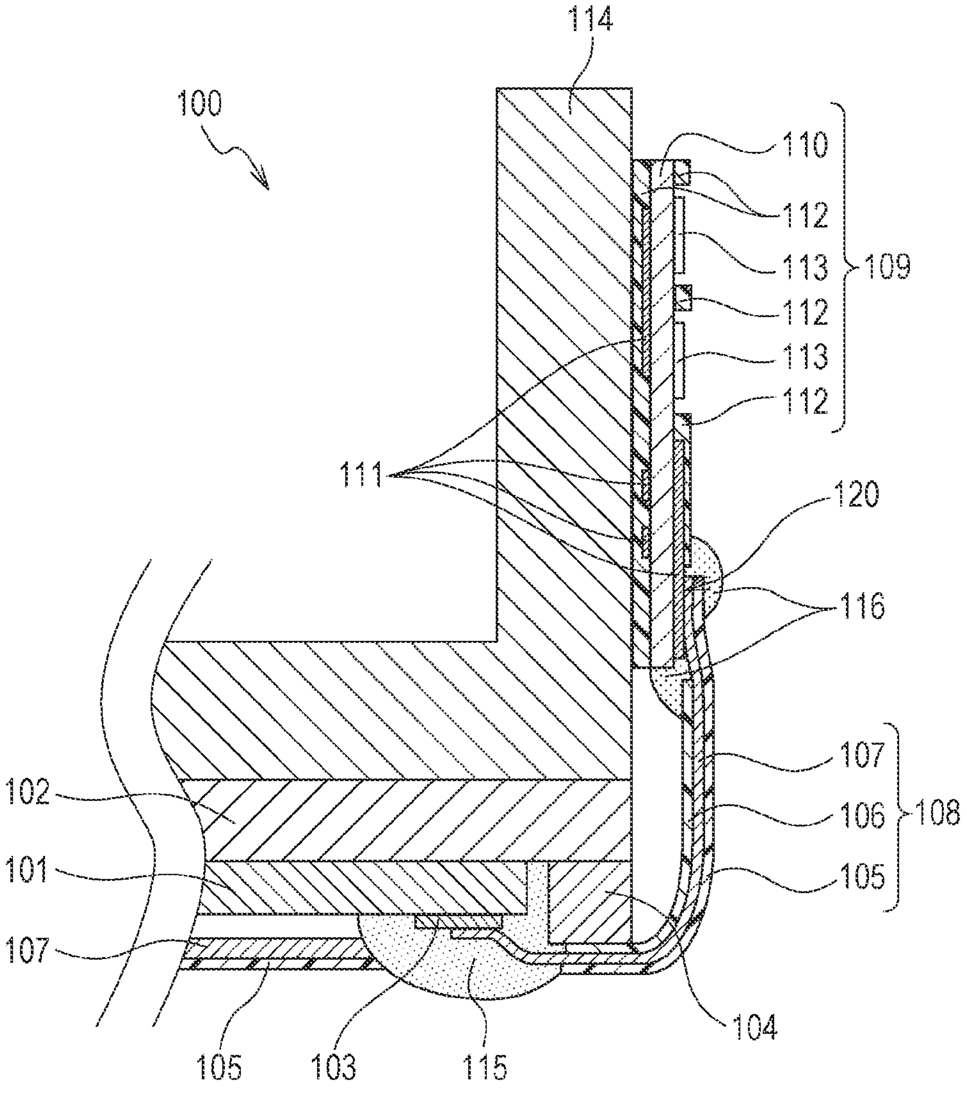
FIG. 3 is a cross-sectional view of a liquid discharge head according to a comparative example.

A liquid discharge head 100 according to a comparative example is described below with reference to FIG. 3. FIG. 3 is a cross-sectional view of the liquid discharge head 100 according to a comparative example. The liquid discharge head 100 includes a print element substrate 101 and a contact wiring substrate 109 for electrical connection with the liquid discharge apparatus main body.

In the liquid discharge head 100 according to the comparative example, the contact wiring substrate 109 and a flexible wiring substrate 108 are connected to each other to supply electric power from a liquid discharge apparatus main body to the print element substrate 101. As the flexible wiring substrate 108, a TAB tape is used that includes a wiring layer 107 made of copper or the like formed on a base film 105 and a cover film 106 covering the wiring layer 107.

To increase the reliability, the base film 105 having thick base material is exposed to the outside and, thus, a cap surface (not illustrated) for capping the print element substrate 101 and its periphery is formed. Furthermore, an electrode pad 103 of the print element substrate 101 and a flying lead disposed on the wiring layer 107 of the flexible wiring substrate are connected with each other by a bonder. The contact wiring substrate 109 and an electrode pad disposed on the wiring layer 107 of the flexible wiring substrate 108 are pressure bonded using an anisotropic conductive film (ACF) (not illustrated). These electric connecting portions are bonded by heat, vibration, or pressure. For this reason, even if the electric connecting portions are gold-plated or the like, liquid, such as ink, easily permeates into a copper wiring portion, which may impair electric reliability. Therefore, a sealing material 115 and a sealing material 116 cover the electric connecting portions to prevent permeation of the liquid, such as ink, and ensure the electric reliability. In particular, since the sealing material 115 is a portion that is brought into contact with the ink, an epoxy resin-based sealing material that has high ink resistance properties and that cures at a temperature exceeding 100° C. is mostly used. In contrast, since the sealing material 116 is disposed near a connecting portion connected to the main body, it is only required to prevent deposition of floating mist and the like in the printer main body and, thus, room-temperature setting silicone-based sealing material having lower ink resistance properties than the sealing material 115 may be used. In this case, sealing protection can be achieved even if the sealing material is applied at any time before and after fixture of the contact wiring substrate 109 to a head casing 114 of the liquid discharge head 100, which provides an advantage that the sequence of production steps can be freely changed without considering deterioration of accuracy caused by thermal deformation.

To form, in the flexible wiring substrate 108, an electrode pad that can be brought into pressure contact from the back surface of the flexible wiring substrate 108 by using the wiring layer 107, the electrode pad is exposed to the side with the cover film 106. Therefore, the flexible wiring substrate 108 is mounted on the same plane as the contact pad 113 of the contact wiring substrate 109 at ACF bonding. That is, according to the comparative example, the electric connecting portion 120 between the flexible wiring substrate 108 and the contact wiring substrate 109 is disposed on the same side as the side where the contact pad 113 of the contact wiring substrate 109 is provided. Furthermore, the sealing material 116 covering the electric connecting portion 120 is disposed so as to protrude outward from the outermost surface of the contact pad 113.

Figure 4A:
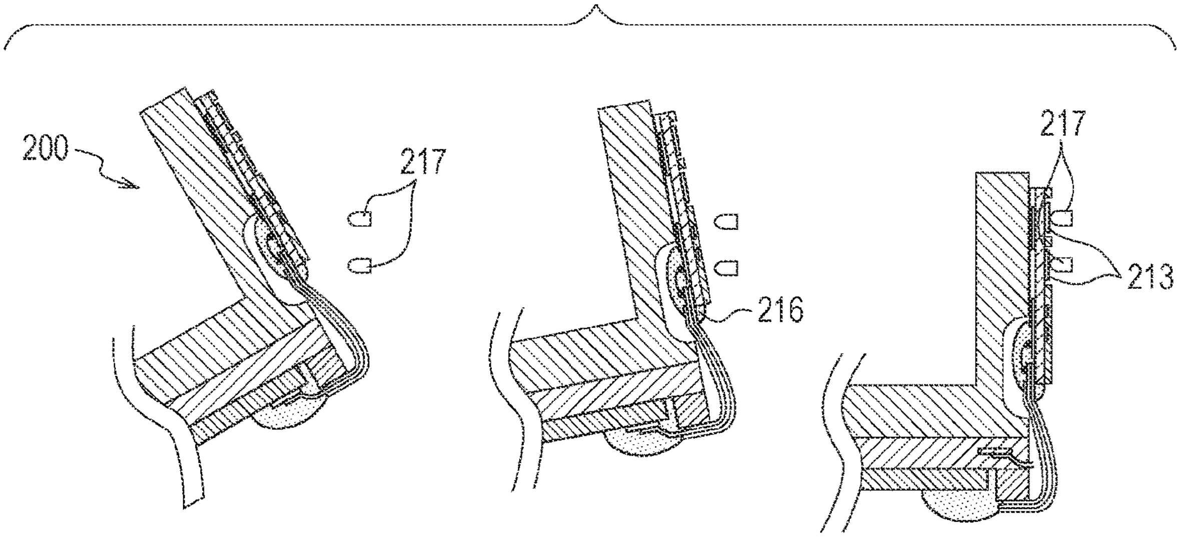
FIGS. 4A and 4B illustrate the mounting path when the liquid discharge head is mounted in a liquid discharge apparatus main body.
Figure 4B:
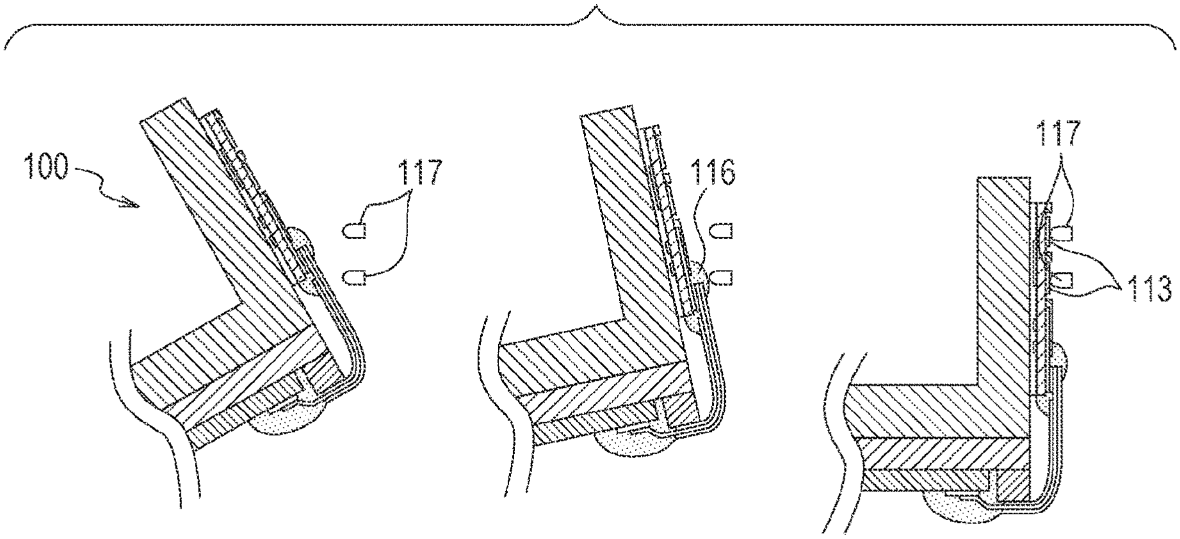

In contrast to the comparative example, according to the present embodiment described above, the amount of protrusion of the sealing material 216 can be reduced. The effect of reducing the amount of protrusion of the sealing material 216 is described below with reference to FIGS. 4A and 4B. FIGS. 4A and 4B illustrate the mounting path when the liquid discharge head 200 is mounted in the liquid discharge apparatus main body. FIG. 4A is a cross-sectional view illustrating the mounting path of the liquid discharge head 200 according to the present embodiment, and FIG. 4B is a cross-sectional view illustrating the mounting path of the liquid discharge head 100 according to the comparative example illustrated in FIG. 3. The liquid discharge head 200 according to the present embodiment is designed to be user replaceable. As illustrated in FIGS. 4A and 4B, the liquid discharge head 200 is rotated and mounted in the apparatus main body so that the contact pin 217 provided on the liquid discharge apparatus main body is brought into contact with the contact pad 213.

As illustrated in FIG. 4B, if the sealing material 116 protrudes from the surface of the contact wiring substrate having the contact pad 113 provided thereon, the sealing material 116 may be brought into contact with the contact pin 117 when the liquid discharge head 100 is mounted. If the sealing material 116 is scraped off by such unexpected contact, the electric reliability may be impaired. Even when a high-strength sealing material, such as thermosetting epoxy, is used as the sealing material 116, the reliability of the electrical connection may be reduced due to, for example, scraping off of the contact pin 117 or deposition of dust. For this reason, contact of the contact pin 117 with the sealing material 116 is not desirable.

In contrast, according to the present embodiment, the amount of protrusion of the sealing material 216 from the surface 209*a* of the contact wiring substrate 209 having the contact pad 213 thereon can be reduced, so that contact of the sealing material 216 with the contact pin 217 can be prevented. As a result, the electric reliability of the electric connecting portion 220 can be ensured.

Note that as described in the comparative example, it is desirable to use a one-component room-temperature setting silicone-based sealing material as the sealing material 216 in order to reduce the production cost while maintaining the ease of assembly and process setting. However, most one-component room-temperature setting sealing materials have a higher ink penetration rate than one-component thermosetting sealing materials, and the reliability of an electrical mounting portion tends to be decreased. In addition, the strengths of most room-temperature setting sealing material are lower than those of the thermosetting sealing materials. According to the present embodiment, even when the sealing material 216 having such properties is used, the electric reliability of the electric connecting portion 220 can be ensured.

In addition, as the size of the apparatus main body is reduced and, thus, the space available for mounting the liquid discharge head decreases, the chance of the sealing material contacting the contact pin increases. As a result, the configuration according to the present embodiment is effective in terms of reduction in the size of the apparatus main body.

Furthermore, it is desirable that a recess portion 219 be provided on a support surface of the head casing 214 (a surface that supports the contact wiring substrate 209) and that the electric connecting portion 220 and the sealing material 216 covering the electric connecting portion 220 be accommodated in the recess portion 219. In this manner, the risk of an increase in the size of the liquid discharge head 200 can be reduced. Furthermore, it is desirable that the inner surface of the recess portion 219 and the sealing material 216 are separated from each other so as not to come into contact with each other. In this manner, the sealing material 216 is less likely to interfere with the head casing 214, and the reliability of the electric connecting portion 220 can be increased. Still furthermore, according to the present embodiment, the recess portion 219 is disposed at a position deviated from the contact pad 213 when the contact wiring substrate 209 is viewed in plan view. As a result, the pressure applied from the contact pin 217 to the contact pad 213 can be received by the support surface of the head casing 214 that supports the contact wiring substrate 209.

Furthermore, the configuration according to the present embodiment in which the electric connecting portion 220 is not disposed outside of the liquid discharge head 200 is highly reliable against irregular damage caused by contact or dropping by the user at a time other than when the liquid discharge head 200 is mounted.

Note that the sealing material 216 is not limited to a room-temperature setting silicone-based sealing material. For example, an urethane-based sealing material, a two-component room-temperature setting sealing material, or the like that sets at room temperature and has sufficient sealing performance can be used. Alternatively, in the case of a system that discharges ink harmful to the sealing material (e.g., strongly acidic, strongly alkaline, or high-concentration solvent), a thermosetting epoxy-based sealing material may be employed as the sealing material 216.

Second Embodiment

Figure 5:
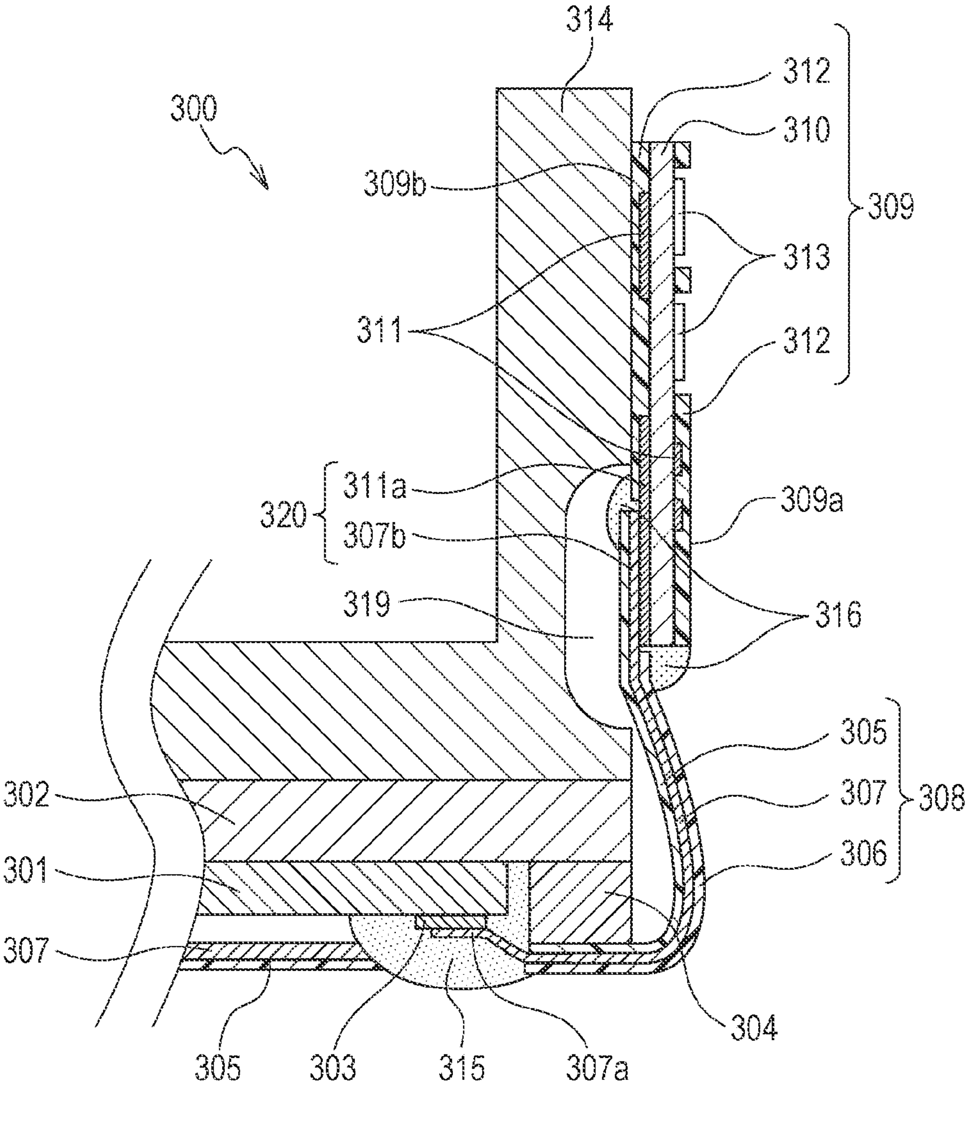
FIG. 5 is a cross-sectional view of a liquid discharge head according to a second embodiment.

FIG. 5 is a cross-sectional view of a liquid discharge head 300 according to the second embodiment. The external appearance of the liquid discharge head 300 according to the present embodiment is substantially the same as that according to the above-described embodiment, and FIG. 5 is a cross-sectional view of the present embodiment corresponding to FIG. 2.

Electric power is supplied from a contact wiring substrate 309 to a print element substrate 301 via a flexible wiring substrate 308. The flexible wiring substrate 308 includes a base film 305, a wiring layer 307, and a cover film 306. According to the present embodiment, a polyimide film is used as the base film 305, and a polyimide film is also used as the cover film 306.

The print element substrate 301 and the flexible wiring substrate 308 are electrically connected to each other by connecting an electrode pad 303 formed on the print element substrate 301 to a flying lead 307*a* formed at the end portion of the wiring layer 307 by using a bonder.

A wiring layer 311 is exposed through a resist material 312, so that an electrode pad 311*a* is formed on a surface 309*b* opposite a surface 309*a* of the contact wiring substrate 309 having a contact pad 313 disposed thereon. In addition, the wiring layer 307 formed on the base film 305 is exposed through the cover film 306, so that an electrode pad 307*b* is formed on the flexible wiring substrate 308. The electrode pad 311*a* and the electrode pad 307*b* are pressure connected via an anisotropic conductive film (ACF) (not illustrated) to form an electric connecting portion 320, and the contact wiring substrate 309 and the flexible wiring substrate 308 are electrically connected to each other. That is, the end portion of the surface 309*b* of the contact wiring substrate 309 and the end portion of the flexible wiring substrate 308 are bonded. Like the above-described embodiment, according to the present embodiment, the electric connecting portion 320 is covered and protected by a sealing material 316. It is desirable that a room-temperature setting silicone-based sealing material be used as the sealing material 316. Furthermore, like the above-described embodiment, a head casing 314 includes a recess portion 319, and the electric connecting portion 320 and the sealing material 316 covering the electric connecting portion 320 are accommodated inside the recess portion 319 to prevent interference between the head casing 314 and the sealing material 316. In this manner, the risk of an increase in the size of the liquid discharge head 300 can be reduced.

The use of flying lead bonding and ACF bonding for electrical connection has a shorter takt time than the use of wire bonding using, for example, a gold wire. As a result, the effect of reducing the production cost can be expected.

However, to connect the contact wiring substrate 309 with the flexible wiring substrate 308 by ACF bonding as in the present embodiment, the electrode pads 311*a* and the electrode pads 307*b* are disposed so as to face each other. To place the electric connecting portion 320 on the side opposite to the surface 309*a* having the contact pad 313 formed thereon, the electrode pad 307*b* exposed through the cover film 306 of the flexible wiring substrate 308 is disposed so as to face the outside of the liquid discharge head 300. That is, in the liquid discharge head 300, the contact wiring substrate 309 is provided so that the cover film 306 is located on the outer side. As a result, the externally exposed surface of the flexible wiring substrate 308 and the cap surface around the print element substrate 301 are formed of the cover film 306. When the cover film 306 is disposed on the outer side in this way, it is desirable that the cover film 306 have the same thickness as the base film 305 or a thickness required for durability in order to have the strength of the cover film 306. According to the present embodiment, the cover film 306 is formed by stacking two films each having a thickness of, for example, 4.4 μm.

However, if multiple general-purpose cover films are stacked or a thick cover film is custom-ordered to increase the thickness, the cost of parts for the flexible wiring substrate may increase. Alternatively, a polyimide film the same as that used for the base film 305 can be used for the cover film 306. However, the cost of the polyimide film is generally higher than that of an aramid film. For this reason, it is desirable that the present embodiment be applied to a configuration other than a configuration used when higher reliability is required (e.g., a configuration in which ink contains a strong acid, a strong alkali, a high-concentration solvent). For the configuration in which the above-described specific ink is not used, the total cost can be reduced by setting the thickness of the cover film 306 according to the present embodiment to an appropriate thickness.

Furthermore, like the above-described embodiment, the present embodiment can prevent or reduce the risk that the sealing material 316 protrudes beyond the outer side surface 309*a* of the contact wiring substrate 309.

Note that unlike the above-described embodiment, if unexpected strong contact occurs so that the sealing material 316 is scraped off, the electrode pad 307*b* of the electric connecting portion 320 may be exposed. However, according to the present embodiment, even when the thickness of the sealing material 316 is increased by the thickness of the contact wiring substrate 309, the head outer shape that is substantially the same as in the configuration of the liquid discharge head 300 according to the comparative example illustrated in FIG. 3 can be maintained. That is, according to the present embodiment, by increasing the thickness of the sealing material 316, an increase in size of the liquid discharge head 300 can be prevented while preventing the risk that the electric connecting portion 320 is exposed. Such an increase in the thickness of the sealing material 316 delays penetration of ink into the electric connecting portion 320 and, therefore, the ink resistance properties can be improved.

As a modification of the present embodiment, for a configuration in which electrical connection is made from the side with the base film 305 by using pressure bonding or a bonder, the ACF and the flying lead 307*a* may be replaced with conductor bumps (gold bumps), and so-called COF (Chip On Film) connection may be made. Even with such a connection configuration, the same effect as in the above-described embodiment can be obtained.

Third Embodiment

Figure 6:
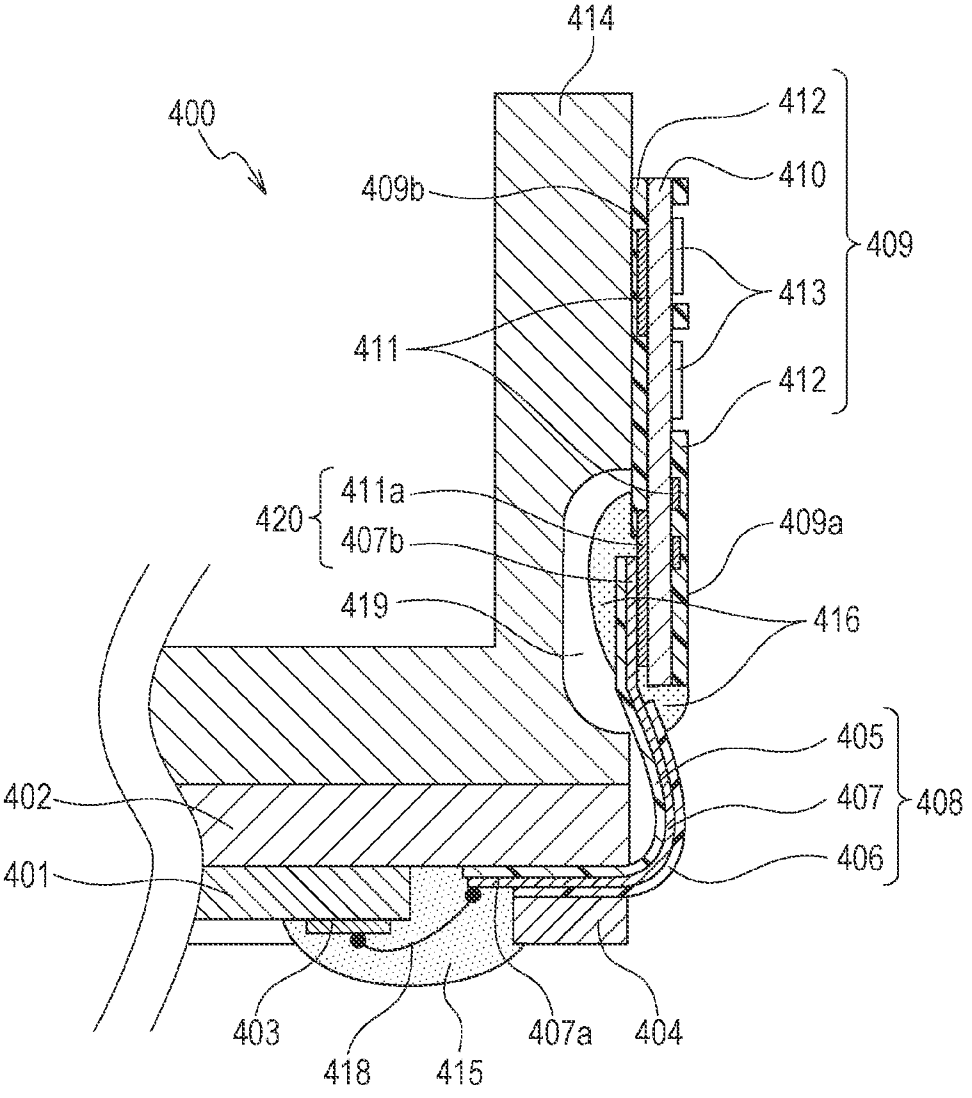
FIG. 6 is a cross-sectional view of a liquid discharge head according to a third embodiment.

FIG. 6 is a cross-sectional view of a liquid discharge head 400 according to the third embodiment. The external appearance of the liquid discharge head 400 according to the present embodiment is substantially the same as that according to the above-described embodiment, and FIG. 6 is a cross-sectional view of the present embodiment corresponding to FIG. 2. According to the present embodiment, like the second embodiment, a contact wiring substrate 409 and a flexible wiring substrate 408 are pressure connected to each other via an ACF on a surface 409*b* opposite a surface 409*a* of the contact wiring substrate 409 having a contact pad 413 thereon and, thus, are electrically connected to each other. An electric connecting portion 420 in which an electrode pad 411*a* of the contact wiring substrate 409 and an electrode pad 407*b* of the flexible wiring substrate 408 are connected to each other is covered and protected by a sealing material 416. The electric connecting portion 420 is accommodated in a recess portion 419 provided in a head casing 414.

The electrical connection between a print element substrate 401 and the flexible wiring substrate 408 differs from that according to the above-described embodiment. More specifically, an electrode pad 403 of the print element substrate 401 and an electrode pad 407*a* formed of a wiring layer 407 etched on a base film 405 of the flexible wiring substrate 408 are bonding connected by a gold wire 418. In wire bonding, an electrical discharge is applied to the tip of a gold wire to melt the metal and form a ball. Thereafter, to complete the connection by using heat, ultrasonic waves, pressure, or the like, wire bonding is performed with each of the print element substrate 401 and the flexible wiring substrate 408 being fixed. Therefore, according to the present embodiment, wire bonding is performed with the print element substrate 401 and the flexible wiring substrate 408 being fixed to the support member 402. According to the above-described embodiment, the flexible wiring substrate constitutes the cap surface around the print element substrate. However, according to the present embodiment, a face cover 404 (a plate) is disposed to constitute a cap surface on a surface of the flexible wiring substrate 408 adjacent to the print element substrate 401. In the configuration according to the present embodiment, a cover film 406 is disposed on the externally exposed side of the flexible wiring substrate 408. However, since the face cover 404 constitutes the cap surface, an excessive thickness of the cover film 406 is not needed. Since the number of components of the configuration is almost the same as that according to the other embodiments, the configuration can be achieved without incurring additional component costs.

Fourth Embodiment

Figure 7:
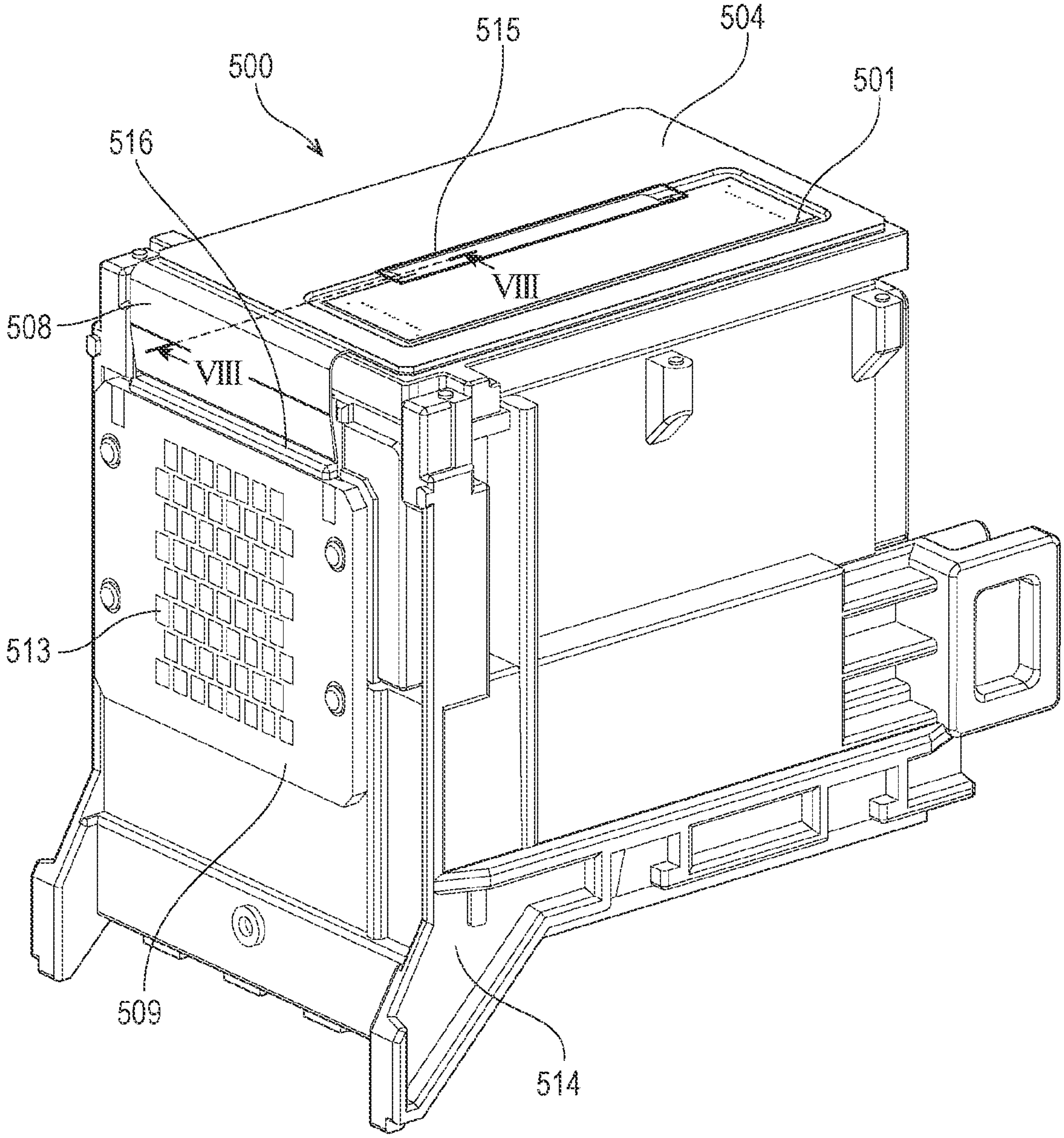
FIG. 7 is a perspective view of a liquid discharge head according to a fourth embodiment.
Figure 8:
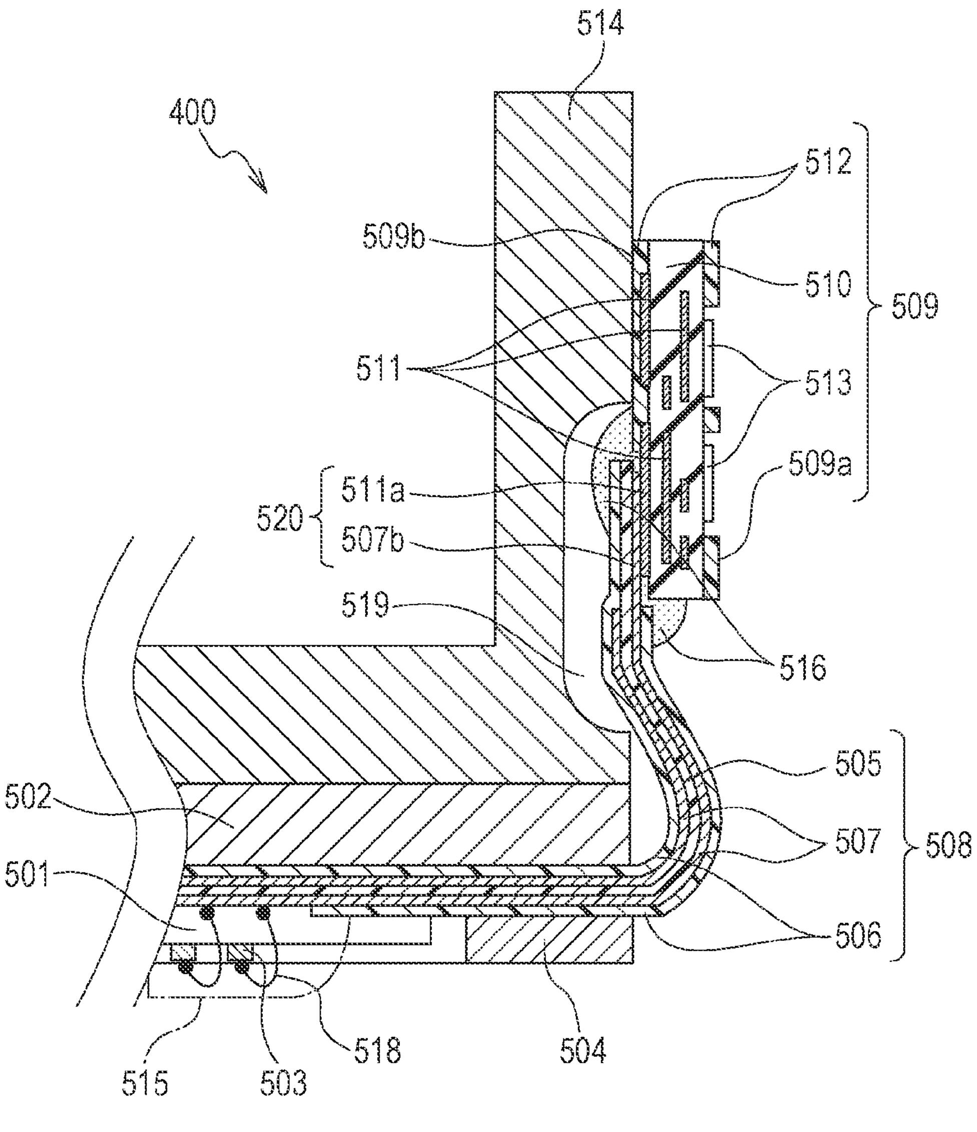
FIG. 8 is a cross-sectional view of a liquid discharge head according to the fourth embodiment.

FIG. 7 is a perspective view of a liquid discharge head 500 according to the fourth embodiment of the present disclosure. In FIG. 7, a print element substrate 501 is illustrated on the upper surface. FIG. 8 is a cross-sectional view taken along the line VIII-VIII of FIG. 7. According to the present embodiment, a contact wiring substrate 509 includes at least three wiring layers 511. In addition, a flexible wiring substrate 508 includes a plurality of wiring layers 507.

In the liquid discharge head 500, to supply electric power from a printer main body to a print element substrate 501, a contact wiring substrate 509 including a contact pad 513 connected to the printer main body is disposed on a side surface of a head casing 514. The electric power is supplied to from the contact wiring substrate 509 to the print element substrate 501 via the flexible wiring substrate 508. The print element substrate 501 includes a large number of nozzles. For this reason, if the electrode pads are disposed only along the short side of the print element substrate 501, the substrate width of the print element substrate 501 needs to be increased and, thus, the number of produced pieces decreases.

Therefore, according to the present embodiment, the electrode pads 503 are disposed along a longitudinal edge of the print element substrate 501. Like the third embodiment, the electrical connection between the print element substrate 501 and the flexible wiring substrate 508 is made by wire bonding 518, and an electric connecting portion is covered and protected by a sealing material 515.

The flexible wiring substrate 508 includes a plurality of wiring layers 507 made of copper or the like formed on the base film 505, and FPC (Flexible printed circuits) made from a plurality of cover films 506 covering the wiring layers 507 are used. According to the present embodiment, an LVDS (Low voltage differential signaling) high-speed differential signal is used for drive control of the print element substrate 501, instead of a single-ended signal. As a result, this configuration can reduce the number of interconnection wires for drive control and can reduce the cost by reducing the size of the flexible wiring substrate 508. According to the present embodiment, to improve the noiseproof property of the LVDS signal line, a microstrip is formed by two of the wiring layers 507 of the flexible wiring substrate 508. Microstrip is a type of configuration in which a ground plane is provided on one side, and a signal line is disposed on the other side with an insulating layer, such as a base film 505, therebetween. The flexible wiring substrate 508 is provided with an electrode pad 507*b* formed of the wiring layer 507 that is exposed through the cover film 506. According to the present embodiment, for example, the base film 505 is a polyimide film having a thickness of 25 μm, and the cover film 506 has a structure in which two aramid films each having a thickness of 4 μm are stacked. As a modification, liquid crystalline polymer (LCP) having a high high-frequency characteristic and a low dielectric constant and having a thickness of 50 μm may be employed for a base film. Similarly, to increase the durability of the cover film, a polyimide film having a thickness of 12.5 μm may be employed.

Similarly, the contact wiring substrate 509 employs, for the LVDS signal line, a microstrip configuration or a strip configuration (the first and second surfaces of the LVDS signal line are sandwiched by ground planes via insulating layers 510). Thus, the contact wiring substrate 509 has a substrate structure including four wiring layers 511. A part of the wiring layer 511 is exposed to form the contact pad 513. In addition, an electrode pad 511*a* for connecting to the flexible wiring substrate 508 is disposed on a surface 509*b* opposite the surface 509*a* of the contact wiring substrate 509 having the contact pad 513 provided thereon. The contact wiring substrate 509 is protected by a resist material 512, except for the contact pad 513 and the electrode pad 511*a*.

The electrode pad 511*a* and the electrode pad 507*b* are pressure connected via an anisotropic conductive film (ACF) (not illustrated) to form an electric connecting portion 520 and, thus, the contact wiring substrate 509 and the flexible wiring substrate 508 are electrically connected to each other. The electric connecting portion 520 is provided on the surface 509*b* opposite the surface 509*a* of the contact wiring substrate 509 having the contact pad 513 provided thereon. The electric connecting portion 520 is covered with a sealing material 516 and is accommodated in a recess portion 519 formed in the head casing 514. Although the sealing material 516 is also disposed on the outer side of the liquid discharge head 500, the amount of protrusion of the sealing material 516 can be decreased as in the above-described embodiment.

According to the present embodiment, the cover film 506 of the flexible wiring substrate 508 is exposed from the surface adjacent to the print element substrate 501. Therefore, like the third embodiment, a face cover 504 for forming a cap surface is disposed on the surface of the flexible wiring substrate 508 adjacent to the print element substrate 501.

According to the present embodiment, since the wiring layer 511 of the contact wiring substrate 509 has a four-layer structure, the substrate area required for connecting each of interconnection wires to the corresponding contact pad 513 is smaller than that of the two-layer structure. For this reason, the contact pad 513 of the contact wiring substrate 509 can be brought closer to the flexible wiring substrate 508, which reduces the size of the contact wiring substrate 509. As a result, the cost can be reduced.

In the case of the liquid discharge head according to the comparative example illustrated in FIG. 3, if the contact pad is brought closer to the flexible wiring substrate, the risk of the contact pin of the main body being brought into contact with the sealing material 116 increases. According to the present embodiment, since the sealing material 516 does not protrude beyond a surface 513*a* of the contact wiring substrate 509 having the contact pad thereon, the risk of contact with the contact pin of the main body is low. For this reason, the contact pad 513 of the contact wiring substrate 509 can be disposed closer to the flexible wiring substrate 508, and the size of the contact wiring substrate 509 can be reduced. According to the present embodiment, as illustrated in FIG. 8, the contact pads 513 are disposed so as to be shifted in the downward direction in FIG. 8. When the contact wiring substrate 509 is viewed in plan view, the contact wiring substrate 509 can be disposed so that the contact pad 513 overlaps at least part of the electric connecting portion 520.

Furthermore, the flexible wiring substrate 508 includes a bent portion that bends from the print element substrate 501 toward the contact wiring substrate 509, and a bending reaction force is generated so that the bent portion of the flexible wiring substrate 508 attempts to return to the flat shape. At this time, in the case of the liquid discharge head according to the comparative example illustrated in FIG. 3, a bending reaction force is generated in a direction in which the flexible wiring substrate 108 and the contact wiring substrate 109 that are pressure bonded (for example, OLB (Outer Lead Bonding) bonded for electrical connection) are peeled off from each other. If the bending reaction force increases, the electrical connection after OLB bonding may be disconnected. According to the present embodiment, since in the electric connecting portion 520, the bending reaction force acts in a direction different from the peeling-off direction for OLB bonding, the configuration of the present disclosure is robust over peeling-off that occurs in OLB bonding due to the bending reaction force.

Liquid Discharge Apparatus

Figure 9:
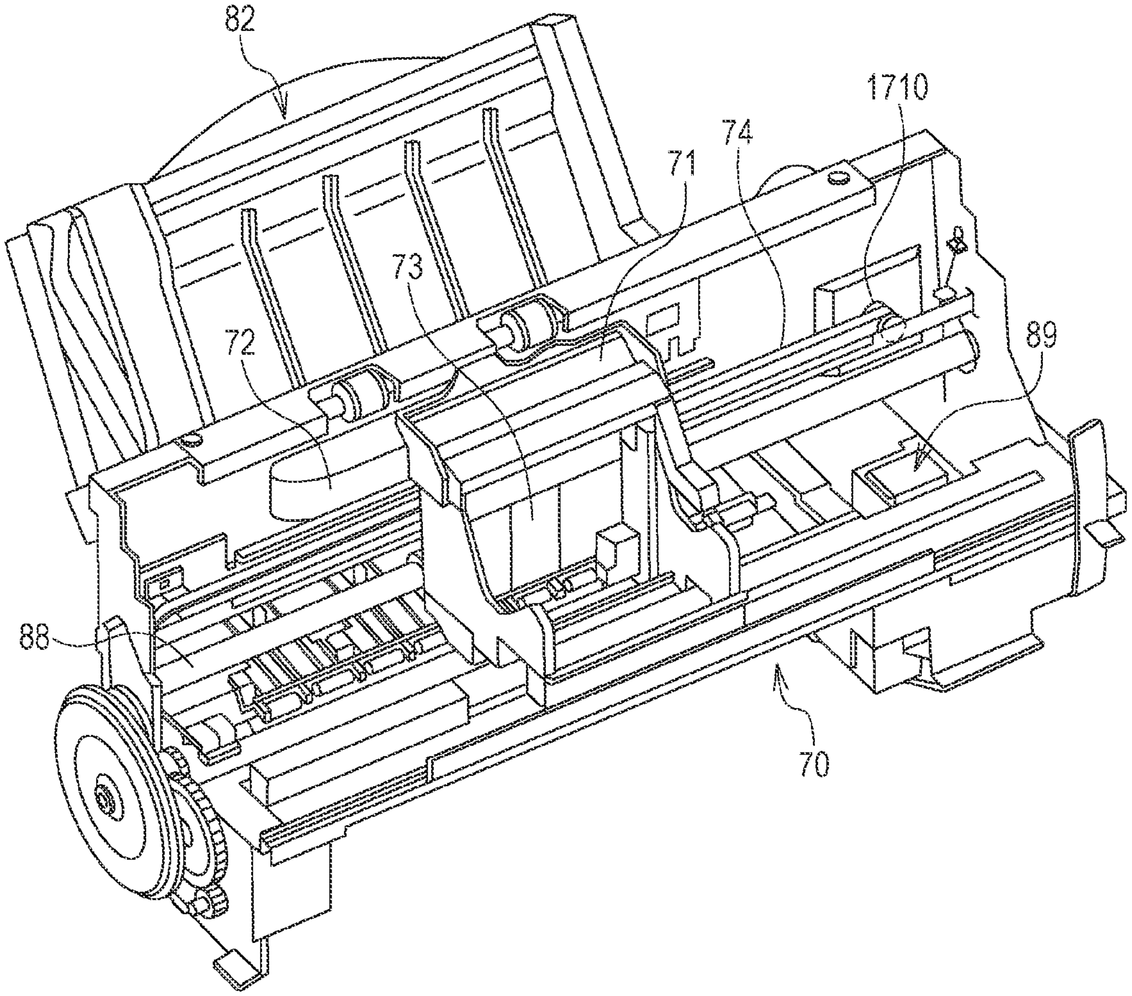
FIG. 9 is a diagram illustrating the external appearance of a liquid discharge apparatus.

FIG. 9 illustrates the external appearance of an example of a liquid discharge apparatus (an inkjet printer) in which the above-described liquid discharge head is to be mounted. The liquid discharge apparatus is known as a serial scan printer 70, in which a liquid discharge head is scanned in a direction orthogonal to the conveyance direction of a recording medium to form an image.

The configuration of the printer 70 and the overview of the operation performed by the printer 70 at the time of liquid discharge is described below. A recording medium (not illustrated) fed from an auto sheet feeder (ASF) 82 is conveyed first toward a recording position by a feed roller driven via a gear by a sheet feeding motor (neither is illustrated). In addition, at a predetermined conveyance position, a carriage 71 is scanned along a guide shaft 88 extending in a direction orthogonal to the conveyance direction by a timing belt 74 driven by a carrier motor 1710. Then, during the scanning process, the discharge operation is performed from the discharge ports of the liquid discharge head which is removably attached to the carriage 71, and the recording operation is performed for a constant bandwidth corresponding to the array of the discharge ports. Thereafter, the recording medium is conveyed, and the recording operation is performed in the next bandwidth.

A flexible cable 72 for supplying a signal for driving the liquid discharge head mounted on the carriage 71 is attached to the carriage 71. One end of the flexible cable 72 is connected to a substrate 73 including the contact pin 217 (FIGS. 4A and 4B) provided on a portion of the carriage 71 on which the liquid discharge head is to be mounted. The other end of the flexible cable 72 is connected to a control circuit (not illustrated) that performs control of the printer 70. Furthermore, a recovery system unit 89 for performing a liquid discharge head recovery process is provided in part of the movable range of the carriage 71, for example, at the home position of the liquid discharge head.

The present disclosure can provide a liquid discharge head including an electric connecting portion that is between a flexible wiring substrate and a contact wiring substrate and that has improved liquid resistance properties.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-105640 filed Jun. 25, 2021, which is hereby incorporated by reference herein in its entirety.

What is claimed is:

1. A liquid discharge head comprising:

a liquid discharge element substrate including a discharge element configured to discharge liquid;

a flexible wiring substrate configured to be electrically connected to the liquid discharge element substrate;

a contact wiring substrate including a first surface having a contact pad provided for external electrical connection, wherein the contact wiring substrate is electrically connected to the flexible wiring substrate; and a support member including a support surface configured to support a second surface opposite the first surface of the contact wiring substrate, wherein an electric connecting portion between the flexible wiring substrate and the contact wiring substrate is disposed on the second surface side of the contact wiring substrate, wherein the flexible wiring substrate includes a base film, a wiring layer disposed on the base film, and a cover film configured to cover the wiring layer, and the cover film has a thickness less than a thickness of the base film, wherein the cover film is disposed on a side with a discharge port surface of the liquid discharge element substrate from which liquid is discharged, and wherein the liquid discharge head further comprises a plate configured to cover the cover film.

2. The liquid discharge head according to claim 1, wherein the electric connecting portion is covered with a sealing material.

3. The liquid discharge head according to claim 2, wherein the support member includes the support surface having a recess portion configured to accommodate the electric connecting portion covered with the sealing material.

4. The liquid discharge head according to claim 3, wherein when the contact wiring substrate is viewed in plan view, the contact pad is located at a position deviated from the recess portion.

5. The liquid discharge head according to claim 3, wherein when the contact wiring substrate is viewed in plan view, the contact pad and the electric connecting portion at least partially overlap each other.

6. The liquid discharge head according to claim 2, wherein the sealing material is of a room-temperature setting type.

7. The liquid discharge head according to claim 1, wherein the flexible wiring substrate includes a bent portion bent between an electric connecting portion connected with the liquid discharge element substrate and the electric connecting portion connected with the contact wiring substrate, and wherein an electrode pad provided on a surface of the flexible wiring substrate facing an outer side of the bent portion is bonded to the electrode pad provided on the second surface of the contact wiring substrate so that the flexible wiring substrate is electrically connected to the contact wiring substrate.

8. The liquid discharge head according to claim 1, wherein the flexible wiring substrate and the contact wiring substrate are connected to each other via one of an anisotropic conductive film and a conductive bump.

9. The liquid discharge head according to claim 1, wherein the flexible wiring substrate and the contact wiring substrate are connected to each other via a conductive wire.

10. The liquid discharge head according to claim 1, wherein the liquid discharge element substrate and the flexible wiring substrate are connected to each other via a conductive wire.

11. The liquid discharge head according to claim 1, wherein the liquid discharge element substrate and the flexible wiring substrate are connected to each other via a flying lead provided in the flexible wiring substrate.

12. The liquid discharge head according to claim 1, wherein the flexible wiring substrate includes a plurality of wiring layers.

13. The liquid discharge head according to claim 1, wherein the contact wiring substrate includes at least three wiring layers.

* * * * *